United States Patent [19]

Roberts et al.

[11] Patent Number: 4,923,682

[45] Date of Patent: May 8, 1990

[54] PREPARATION OF PURE TITANIUM DIOXIDE WITH ANATASE CRYSTAL STRUCTURE FROM TITANIUM OXYCHLORIDE SOLUTION

[75] Inventors: George L. Roberts; Earl R. Lawhorne, both of Savannah, Ga.

[73] Assignee: Kemira, Inc., Savannah, Ga.

[21] Appl. No.: 331,628

[22] Filed: Mar. 30, 1989

[51] Int. Cl.$^5$ ............................................. C01G 23/047
[52] U.S. Cl. ..................................... 423/611; 423/610; 423/612; 106/436; 106/437
[58] Field of Search ....................... 423/612, 610, 611; 502/350; 106/436, 437

[56] References Cited

U.S. PATENT DOCUMENTS 2,113,946  4/1938  Plechner ............................. 423/612
3,923,968  12/1975  Basque ................................ 106/436

FOREIGN PATENT DOCUMENTS 0662502  5/1979  U.S.S.R. ............................. 423/610

Primary Examiner—Robert L. Stoll
Assistant Examiner—Steven J. Bos
Attorney, Agent, or Firm—Hurt, Richardson, Garner, Todd & Cadenhead

[57] ABSTRACT

A method for producing titanium dioxide with an anatase crystal structure from a titanium oxychloride solution. Titanium tetrachloride is mixed with water to form titanium oxychloride, which in turn is mixed with an organic reagent, preferably sorbitol. The resulting solution is hydrolyzed, precipitated and calcined to form titanium dioxide with an anatase crystal structure.

20 Claims, No Drawings

PREPARATION OF PURE TITANIUM DIOXIDE WITH ANATASE CRYSTAL STRUCTURE FROM TITANIUM OXYCHLORIDE SOLUTION

BACKGROUND OF THE INVENTION

Titanium dioxide can be prepared via the "sulfate" process or by the hydrolysis of titanium tetrachloride. In the latter process, titanium tetrachloride is added to water to form a titanium hydrolysate. The hydrolysate is then calcined to form the finished titanium dioxide. For example, in U.S. Pat. No. 2,426,788, a titanium tetrachloride solution is added at a controlled rate to a small amount of hot water maintained at or near the boiling point. The titanium tetrachloride is hydrolyzed and precipitates out as a hydrolysate, which is then calcined. In U.S. Pat. No. 2,337,215, a titanium oxychloride nucleating material is used to initiate the hydrolysis of titanium salt solutions.

In U.S. Pat. Nos. 3,329,484 and 3,528,773, pigment-grade titanium dioxides are disclosed. In each of these patents, a master solution is prepared by digesting titanium containing ore in a large excess (at least 100%) of hydrochloride acid resulting in a high chloride to titanium ratio solution. U.S. Pat. No. 3,329,484 discloses the precipitation of titanium dioxide from the master solution at temperatures of about 100° C. and higher and at autogenous pressure. The precipitated titanium dioxide may or may not be calcined to further develop the tinting strength. U.S. Pat. No. 3,528,773 discloses a two-step process wherein the first step consists of the precipitation of titanium dixoide from the master chloride solution at temperatures from about 100° C. and higher and at autogenous pressure, and the second step consists of "re-treating" the precipitated titanium dioxide with an acidic solution so as to produce titanium dioxide of increased crystal size. The increased crystal size also results in increased tinting strength such that calcination is not needed. Both Nos. 3,329,484 and 3,528,773 disclose processes which produce rutile crystals.

Titanium dioxide with anatase crystal structure is normally prepared by the sulfate process. This process involves multiple steps starting with digestion of titaniferous ores in sulfuric acid which gives a solution containing essentially all of the impurities which were present in the ore. Next, the solution is hydrolyzed and precipitated. The precipitation step leaves much of the impurity content in solution. Thus, the resulting hydrolysate must still be subjected to additional purification steps, such as by filtering and washing. Lastly, the hydrolysate is calcined to obtain the final product, which is highly suited to its intended use, but it does not possess the very high purity which is often desired for some of the new high technology applications.

To enhance anatase production, up to 0.75% $K_2CO_3$ (based on $TiO_2$ equivalent pulp content) may used as a conditioning agent in the sulfate process. Additionally, some impurities, such as phosphorous which is inherent from the ore, cannot be separated by any known conventional means, generally leaving up to 0.75% $P_2O_5$ in normally prepared anatase $TiO_2$.

SUMMARY OF THE INVENTION

On the other hand, we have discovered a process by which anatase titanium dioxide may be prepared by the hydrolysis of titanium tetrachloride. The process of our present invention involves chlorination of ores to yield titanium tetrachloride which can then be purified to a high degree by means of distillation. Subsequently, this purified $TiCl_4$ is mixed with pure, deionized water to form the titanium oxychloride solution from which very pure titanium hydrolysate can be precipitated. The distinctive advantage of this invention is that precipitation will not be limited to preparation of rutile end products, but that either anatase or rutile crystal forms can be made.

Precipitation from titanium oxychloride solutions normally yields titania hydrolysates which are mostly amorphous, but which also possess some rutile crystal structure. These hydrolysates will convert into a crystalline rutile structure very easily at temperatures of 500–600° C. When precipitation is carried out in the presence of sorbitol, according to this invention, the crystal structure will be anatase instead of rutile. The hydrolysate is then filtered, washed and dried in an oven, and subsequently calcined at temperatures of about 500° C. to about 750° C., resulting in pure $TiO_2$ with an anatase crystal structure. By pure $TiO_2$, we mean that the $TiO_2$ product includes no fluxing agent, such as potassium or phosphorous, as is commonly used in producing $TiO_2$ pigments by the sulfate process. Other organic reagents may also be used to produce $TiO_2$ with an anatase crystal structure as discussed in more detail below.

Titanium dioxide has many applications in the field of high technology electronics. All of these are dependent upon the semiconductor properties of $TiO_2$, and these properties are in turn dePendent upon purity and crystal structure. The rutile crystal is the most stable form and is the most widely used form of $TiO_2$. Anatase, however, has a crystal lattice which is slightly more open and less dense than rutile. This difference is reflected in some unusual electrical properties which are believed to be peculiar only to the anatase crystal structure.

DETAILED DESCRIPTION OF THE INVENTION

In carrying out the method of our invention, an aqueous solution of titanium oxychloride ($TiOCl_2$) is formed by mixing commercially pure anhydrous titanium tetrachloride ($TiCl_4$) with pure water. Preferably, but not necessarily, the resulting solution will contain approximately 50% water by weight, and contain the equivalent of about 300 grams of titanium dioxide ($TiO_2$) per liter of solution. This solution optionally may be further purified by treatment with gaseous hydrogen sulfide and/or passage through a column of activated charcoal to remove trace amounts of heavy metals such as arsenic and antimony. (Ref. U.S. Pat. No. 4,783,324, Walters, et al.)

A nuclei "seed" suspension is conveniently prepared separately by careful neutralization of a dilute solution of titanium oxychloride with ammonium hydroxide. The seed suspension is stabilized by heating and aging it for about 10 to about 100 minutes at between about 70° C. and about 80° C.

Precipitations are carried out in suitable equipment so that only glass, plastic, or other corrosion resistant material contacts the reactants. A typical set-up employs a round bottom, 3-neck pyrex glass flask which is heated by a suitable electric heating mantle. Agitation is provided through a ground glass bearing in the center neck. One side neck is fitted with a water cooled glass condenser which is also hooked in to a fume scrubbing system. The third neck is equipped to hold a thermometer and to provide for reagent addition or for sampling.

Initially, the titanium oxychloride solution and from about 0.1 to about 10.0% by weight of sorbitol or another organic reagent are introduced into the flask and heating and agitation are commenced. When batch temperature reaches about 60° C., from about 0.1% to about 5.0% by weight of the fine particle size $TiO_2$ seed, or nuclei, solution is added to initiate hydrolysis and precipitation. The heating is then continued to the boiling point of the solution. Boiling is continued for about 2 to about 5 hours until precipitation is essentially complete. The precipitation rate and eventual recovery can be varied by changing the concentration of the solution to be hydrolyzed and the amount of seed or nuclei added.

The concentration of the solution to be hydrolyzed, which is usually expressed in terms of equivalent $TiO_2$ content, may vary from about 50-300 grams $TiO_2$ per liter but will usually be 150-255 g/l. The amount of seed added should be 0.1-10.0%, preferably 2.0-5.0%, by weight, $TiO_2$ based upon $TiO_2$ in the solution to be hydrolyzed. For this invention, sorbitol or another organic reagent such as sugar, polyhydric alcohol, or starch, or an organic acid which readily sequesters, or forms complexes, with various metal ions, such as citric, tartaric, and gluconic acids, EDTA and salts of EDTA, is added as a solution to the initial batch. The stated $TiO_2$ concentration is the total equivalent of $TiO_2$ in the total volume after all reactants are added.

When precipitation is essentially complete, the batch may be filtered using glass fiber filter media to separate the titanium hydrolysate from the supernatant liquid, and then washed with a quantity of distilled water to remove any residuals such as salts and acids. The washed hydrolysate cake is then dried at from about 100° C. to about 125° C. The dried hydrolysate is then calcined at from about 500° C. to about 750° C. for about one hour. The resulting product is essentially pure $TiO_2$ with an anatase crystal structure.

The most remarkable feature of the titanium dioxide of the invention is the anatase crystal structure. In the past, precipitation of titanium dioxide from titanium oxychloride solutions, with subsequent calcining, resulted in titanium dioxide with a rutile crystal structure. We have found that the addition of an organic reagent, such as sorbitol, results in the production of an anatase crystal structure.

The practice of this invention is illustrated by the following examples:

EXAMPLE I

Precipitation was carried out in a 5000 ml sized round bottom, three-neck, pyrex flask. External heating was provided by an electric heating mantle. Agitation was provided by a Teflon* stirring paddle on a ground glass shaft through a ground glass bearing in the center neck. One side neck was fitted with a water cooled condenser to prevent extensive volume and concentration change during boiling. This condenser was also connected into a fume scrubber to collect gaseous HCl which volatilizes during the precipitation. The third opening was used for temperature measurement, sampling, and reagent addition.

The initial charge in the flask was 3180 ml of titanium oxychloride solution containing an equivalent of 682.5 grams $TiO_2$, which was prepared by adding commercially pure titanium tetrachloride to pure distilled water. A "seed" slurry was prepared independently by careful neutralization of a dilute solution of titanium oxychloride with ammonium hydroxide and stabilized by aging for 60 minutes at 75° C. immediately after neutralization.

The $TiOCl_2$ solution was heated to 60° C. at which time 320 ml of the seed slurry containing 17.5 g of fine particle size $TiO_2$ seed was added. This provided 2.5% $TiO_2$, as "seed", based upon total equivalent $TiO_2$ content which was 200 g/l at the beginning of precipitation. Heating was continued at a controlled rate of 0.5 degrees C. per minute up to the boiling point. Boiling was continued for 2½ hours until more than 90% of $TiO_2$ content had been precipitated. The precipitated $TiO_2$ hydrolysate slurry was separated by filtration using glass fiber filter media and the cake was washed lightly with distilled water. The cake was then dried for about 1 to about 8 hours at from about 110° C. to about 125° C. and then calcined in a rotary calciner of fused silica with the muffle furnace set at 750° C. for one hour. The actual temperature of the $TiO_2$ inside the fused silica flask is somewhat lower, that is about 700° C. X-ray diffraction showed the calcined product to be 97.8% rutile.

EXAMPLE II

The initial charge to this batch was 2860 ml of $TiOCl_2$ solution which contained an equivalent of 665 grams $TiO_2$. A seed volume of 640 ml, containing 35 grams of fineparticle size $TiO_2$ seed was added to give a batch with a nominal total $TiO_2$ concentration of 200 g/l with 5% added nuclei. Total boiling time was two hours and precipitation recovery was 95.8%. The precipitate was filtered, washed, dried, and calcined as for Example I. Rutile content was 97.2%.

EXAMPLE III

This batch was set up and precipitation was carred out exactly as for Example I, except that 70 grams (i.e., 10% $TiO_2$ weight basis) of crystalline sorbitol was dissolved in the batch before adding the seed nuclei. This batch required five hours of boiling to precipitate 95% of the original contained $TiO_2$. The hydrolysate was filtered to the point that all of the strongly acidic filtrate was removed, and then the nature of the filter cake changed and became nearly impermeable to wash water. The final filter cake had the texture and feel of automotive grease with a burnt sugar color. After drying at 110-125° C., the hydrolysate was calcined at 750° C. Calcination was carried out in a shallow open dish because titania hydrolysates containing organic reagents were found to cause deposition of soot inside the neck of rotary calciner equipment resulting in contaminated pigments. X-ray diffraction showed $TiO_2$ with an essentially pure anatase crystal structure with only about 0.55% rutile (scan showed only anatase peaks).

EXAMPLE IV

This example was prepared as for Example II, i.e., using 5.0% nuclei, except that 10% sorbitol, on a $TiO_2$ weight basis, was dissolved in the batch prior to nucleation. A total boiling time of two hours was employed, but the precipitation recovery was only 82% as compared to the 92.5% when sorbitol was not used. The hydrolysate was filtered and washed in a manner similar to Example III. After the hydrolysate was dried at 110-125° C., it was calcined in an open dish at 750° C.

X-ray diffraction showed TiO$_2$ with an essentially pure anatase crystal structure with only about 2% rutile.

EXAMPLE V

A series of precipitations was designed to demonstrate the effect of sorbitol upon crystal structure. All Precipitations were made with same nominal total TiO$_2$ concentration of 200 g/l and using 2.0% TiO$_2$ as seed nuclei. Sorbitol addition was 0.0, 2.5, 5.0 and 10% respectively, based on TiO$_2$ weight. After processing as described as for Example III, samples were calcined in an open dish at 700° C. for one hour. Rutile content versus sorbitol contents were as follows:

0.0% Sorbitol—99.3% Rutile
2.5% Sorbitol—98.1% Rutile
5.0% Sorbitol—21.8% Rutile
10.0% Sorbitol—0.6% Rutile

EXAMPLE VI

A series of precipitations was made to compare the effectiveness of other organic compounds in suppressing rutile content and promoting anatase crystal structure for TiO$_2$ precipitated from titanium oxychloride solution. Precipitation procedure and subsequent processing were as described for Example III. Nominal total TiO$_2$ concentration was 200 g/l and 2.5% TiO$_2$, as seed, was added to each batch. Each organic reagent was added at 10% by weight of TiO$_2$ in the batch. The reagents added and the final rutile content before and after calcination at 700° C. were as follows:

| REAGENTS | DRIED @ 110° UNCALCINED | % RUTILE CALCINED @ 550° C. | % RUTILE CALCINED @ 700° C. |
|---|---|---|---|
| Sorbitol | Anatase only | 0.1 | 0.4 |
| Mannitol | Approx. equal mixed Anatase and Rutile | 51.5 | 98.2 |
| Citric Acid | Anatase only | 4.3 | 88.2 |
| Gluconic Acid | Approx. equal mixed Anatase and Rutile | 51 | 95.7 |
| Pentaerythritol | ¾ Rutile, ¼ Anatase | 90.9 | 99.9 |
| Tartaric Acid | Small amount Anatase - mostly rutile | 95.7 | 99.2 |

It is to be understood that the form of the invention herein above shown and described is to be taken as the preferred examples of the same, and that various changes in our process may be resorted to, without departing from the spirit of the invention or scope of the appended claims.

What is claimed is:

1. A method for producing titanium dioxide with anatase crystal structure, comprising the steps of:
    (a) providing a titanium oxychloride solution;
    (b) providing a quantity of an organic reagent selected from the group consisting of sugar, polyhydric alcohols, starch and organic acids which readily form complexes with metal ions;
    (c) adding said organic reagent in an amount equivalent to about 0.1 to about 10.0% by weight based on titanium dioxide concentration to said titanium oxychloride solution;
    (d) providing a seed suspension of titanium dioxide;
    (e) adding said seed suspension to the resultant solution from step (c);
    (f) heating said resultant solution including said seed suspension to boiling and continuing boiling for a period sufficient to effect precipitation of titanium hydrolysate;
    (g) recovering the precipitated titanium hydrolysate; and
    (h) calcining said precipitated titanium hyrolystate to form an anatase titanium dioxide as the final product.

2. A method as claimed in claim 1, including the step of passing said titanium oxychloride solution through a column of activated charcoal and to remove impurities therein prior to step (b).

3. A method as claimed in claim 1, wherein said organic reagent is sorbitol.

4. A method as claimed in claim 1, wherein said organic acid is selected from citric, tartaric and gluconic acids, EDTA and salts of EDTA.

5. A method as defined in claim 1, wherein said organic reagent is selected from the group consisting of sorbitol, mannitol, or pentaerythritol.

6. A method as claimed in claim 1, wherein the amount of seed suspension added in step (e) is from about 0.1 to about 10.0% by weight based on titanium dioxide concentration in said solution.

7. A method as claimed in claim 1, wherein said heating step has a duration of from about 2 to about 5 hours.

8. A method as claimed in claim 1, wherein said calcination step is carried out at a temperature of from about 500° C. to about 750° C. for a period of from about 0.5 to about 2 hours.

9. A method as claimed in claim 1, wherein the concentration of said titanium oxychloride solution is from about 50 to about 300 g of titanium dioxide equivalent per liter of solution.

10. A method as claimed in claim 1, wherein said titanium oxychloride solution is obtained by providing a quantity of titanium tetrachloride and mixing said titanium tetrachloride with water to form said titanium oxychloride solution.

11. A method as claimed in claim 3, wherein the amount of sorbitol added is from about 2.5% to about 10% by weight based on equivalent titanium dioxide concentration in said solution.

12. A method as claimed in claim 1, wherein the concentration of said titanium oxychloride solution is from about 150 to about 255 g of titanium dioxide equivalent per liter of solution.

13. A method as claimed in claim 1, wherein the amount of seed suspension added in step (e) is from about 2% to about 5% by weight titanium dioxide based on titanium dioxide concentration in said solution.

14. A method as defined in claim 1, wherein the step of recovering the precipitated titanium hydrolysate includes filtering, washing and drying the hydrolysate precipitate before calcining.

15. A method as claimed in claim 1 wherein the final product of anatase titanium dioxide is at least 78.2% anatase.

16. A method as claimed in claim 1, including the step of treating said titanium oxychloride solution with gaseous hydrogen sulfide to remove impurities therein prior to step (b).

17. A method as claimed in claim 1, including the step of passing said titanium oxychloride solution through a column of activated charcoal and treating said titanium oxychloride solution with gaseous hydrogen sulfide to remove impurities therein prior to step (b).

18. A method as claimed in claim 12 wherein the final product of anatase titanium dioxide is at least 78.2% anatase.

19. A method for producing titanium dioxide with an anatase structure, comprising the steps of:
 (a) providing a quantity of titanium tetrachloride;
 (b) adding said titanium tetracholoride to water to form a titanium oxychloride solution containing from about 50 to about 300 g of titanium dioxide equivalent per liter of solution;
 (c) providing a quantity of an organic reagent selected from the group consisting of sugar, polyhydric alcohols, starch, and organic acids which readily form complexes with metal ions;
 (d) adding said organic reagent to said titanium oxychloride solution to form a resultant solution containing from about 0.1% to about 10.0% organic reagent by weight based on titaniam dioxide concentration in said solution;
 (e) providing a seed suspension of titanium dioxide containing the equivalent of from about 0.1% to 10.0% by weight based on titanium dioxide concentration in said solution;
 (f) adding said seed suspension to said resultant solution;
 (g) heating said resultant solution to boiling and continuing boiling for a period sufficient to effect precipitation of titanium hydrolysate;
 (h) recovering the precipitated titanium hydrolysate;
 (i) calcining said precipitated titanium hydrolysate to form an anatase titanium dioxide as the final product.

20. A method as claimed in claim 19, wherein said organic reagent is selected from the group consisting of sorbitol, mannitol, or pentaerythritol.

* * * * *